United States Patent
Shahan et al.

(10) Patent No.: US 11,187,047 B1
(45) Date of Patent: Nov. 30, 2021

(54) MULTI-DEGREE OF FREEDOM VIBRATION ISOLATOR

(71) Applicant: HRL LABORATORIES, LLC, Malibu, CA (US)

(72) Inventors: David W. Shahan, Los Angeles, CA (US); Sloan P. Smith, Moorpark, CA (US); Adam E. Sorensen, Moorpark, CA (US); Casey J. Sennott, Calabasas, CA (US); Christopher P. Henry, Thousand Oaks, CA (US); Geoffrey P. McKnight, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 263 days.

(21) Appl. No.: 16/004,854

(22) Filed: Jun. 11, 2018

Related U.S. Application Data

(60) Provisional application No. 62/524,867, filed on Jun. 26, 2017.

(51) Int. Cl.
*F16F 13/10* (2006.01)
*E21B 17/07* (2006.01)
(Continued)

(52) U.S. Cl.
CPC ............... *E21B 17/07* (2013.01); *F16F 7/00* (2013.01); *E21B 47/017* (2020.05); *F16F 2230/007* (2013.01)

(58) Field of Classification Search
CPC ........ F16F 13/08; F16F 13/085; F16F 13/105; F16F 13/106; F16F 13/107; F16F 13/108;
(Continued)

(56) References Cited

U.S. PATENT DOCUMENTS 2,527,541 A * 10/1950 Gibbs .................... B65D 81/07
215/386
3,137,466 A    6/1964 Rasmussen
(Continued)

FOREIGN PATENT DOCUMENTS

| DE | 102013005543 A1 * | 10/2014 | ........... B60G 21/052 |
| FR | 3014158 A1 * | 6/2015 | .............. F16F 13/08 |
| GB | 2137310 A * | 10/1984 | ............... F16D 3/00 |

*Primary Examiner* — Robert A. Siconolfi
*Assistant Examiner* — Stephen M Bowes
(74) *Attorney, Agent, or Firm* — Lewis Roca Rothgerber Christie, LLP

(57) ABSTRACT

A multi-axis isolator configured to isolate a payload from unwanted vibrations and shocks includes a housing, at least one pair of radial isolators in the housing, and an axial isolator in the housing. Each radial isolator includes an elastomer dome, a chamber at least partially defined by the elastomer dome, and a fluid in the chamber. The multi-axis isolator also includes a fluid track placing the chambers of the radial isolators in fluid communication with each other. The axial isolator includes an elastomer dome, a backpressure membrane, a primary chamber, a backpressure chamber, a fluid in the primary and backpressure chambers, a conduit placing the primary chamber in fluid communication with the backpressure chamber. The multi-axis isolator also includes a shaft configured to be connected to the payload. The pair of radial isolators and the axial isolator are coupled to the shaft.

15 Claims, 9 Drawing Sheets

(51) Int. Cl.
*F16F 7/00* (2006.01)
*E21B 47/017* (2012.01)

(58) Field of Classification Search
CPC .... F16F 13/14; F16F 13/1409; F16F 13/1418; F16F 13/1427; F16F 13/1445; F16F 13/1454; F16F 13/1463; F16F 13/1481; F16F 13/149; F16F 13/16; F16F 13/18
See application file for complete search history.

(56) References Cited

U.S. PATENT DOCUMENTS

| | | | |
|---|---|---|---|
| 4,779,852 A | 10/1988 | Wassell | |
| 4,895,353 A | 1/1990 | Roth et al. | |
| 4,962,915 A | 10/1990 | Thorn | |
| 5,013,012 A * | 5/1991 | Jouade | F16F 13/1463 267/140.12 |
| 5,172,893 A * | 12/1992 | Bouhier | F16F 13/16 180/312 |
| 5,489,193 A * | 2/1996 | Levallard | B64C 27/51 267/140.13 |
| 5,516,084 A | 5/1996 | Rizzo | |
| 6,386,134 B1 | 5/2002 | Monson et al. | |
| 6,565,061 B1 | 5/2003 | Petersen et al. | |
| 2013/0206395 A1 | 8/2013 | Cramer | |
| 2013/0320604 A1 * | 12/2013 | Ohki | F16F 13/08 267/140.11 |
| 2015/0145190 A1 * | 5/2015 | Kishida | F16F 13/1481 267/140.11 |

\* cited by examiner

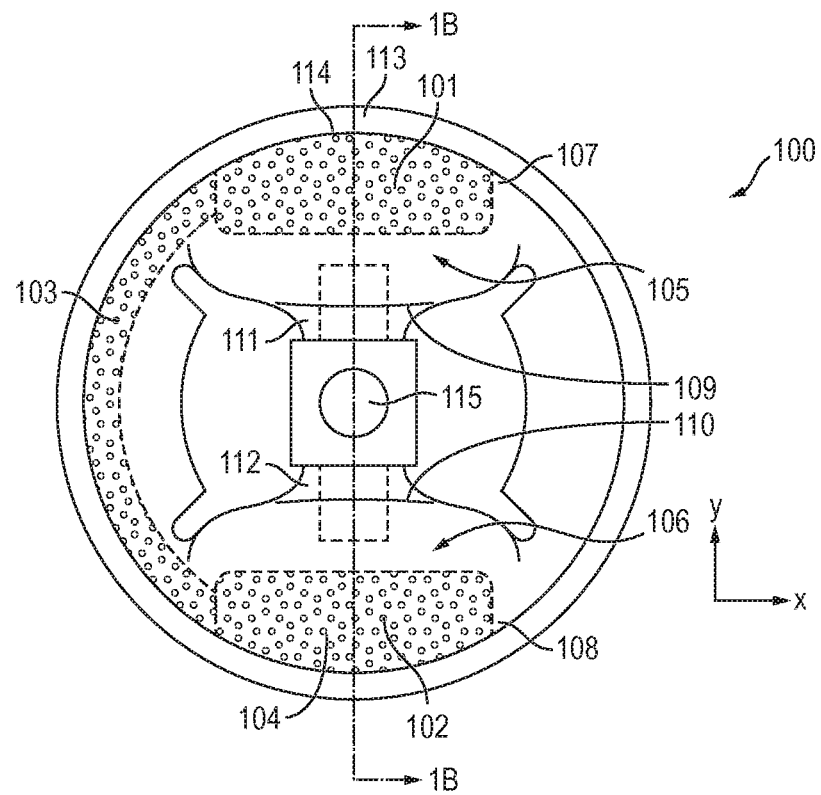
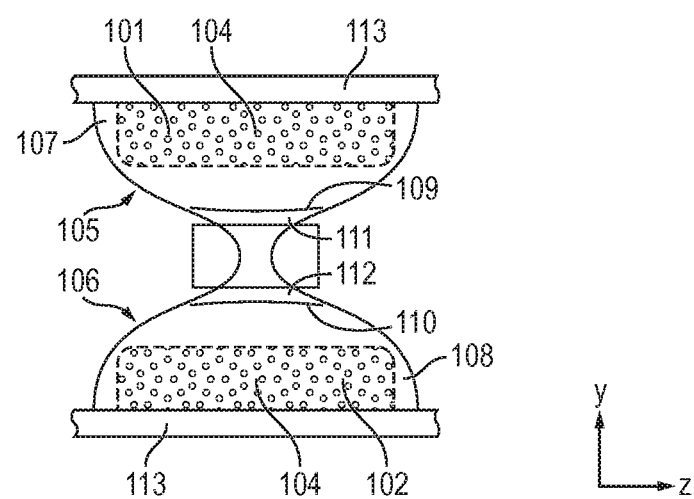
FIG. 1A
FIG. 1B

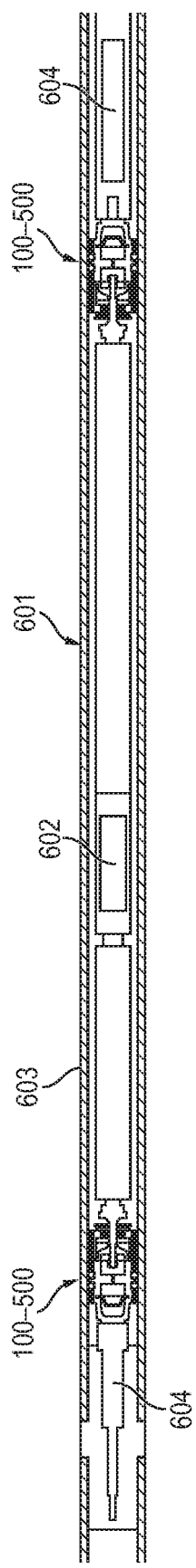

US 11,187,047 B1

MULTI-DEGREE OF FREEDOM VIBRATION ISOLATOR

CROSS-REFERENCE TO RELATED APPLICATION

The present application claims priority to and the benefit of U.S. Provisional Application No. 62/524,867, entitled "Multi Degree of Freedom Vibration Isolator," filed Jun. 26, 2017, the entire content of which is incorporated herein by reference.

FIELD

The present disclosure relates generally to fluid and elastomer vibrations isolators.

BACKGROUND

A variety of different types of isolators are commonly utilized to isolate sensitive components, such as a sensor chassis in a drill pipe or an electronics suite in a missile, from unwanted vibrations and/or shocks. Related art isolators include mechanical snubbers, solid elastomer mounts or barriers, hydraulic engine mounts, and bushings. However, these related art isolators may provide relatively low levels of vibration isolation due to the relatively small amount of travel of the isolator and/or the inherent material properties of the isolator. Additionally, some related art isolators may be configured to attenuate vibrations in only one primary direction, such as an axial direction.

SUMMARY

The present disclosure is directed to various embodiments of a multi-axis isolator configured to isolate a payload from unwanted vibrations and shocks. In one embodiment, the multi-axis isolator includes a housing, at least one pair of radial isolators in the housing, an axial isolator in the housing, and a shaft configured to be connected to the payload. A first radial isolator and a second radial isolator of the pair of radial isolators each includes an elastomer dome, a chamber at least partially defined by the elastomer dome, and a fluid in the chamber. The pair of radial isolators also includes a fluid track placing the chamber of the first radial isolator in fluid communication with the chamber of the second radial isolator. The axial isolator includes an elastomer dome, a backpressure membrane, a primary chamber at least partially defined by the elastomer dome, a backpressure chamber at least partially defined by the backpressure membrane, a fluid in the primary and backpressure chambers, and a conduit placing the primary chamber in fluid communication with the backpressure chamber. The pair of radial isolators and the axial isolator are coupled to the shaft.

The multi-axis isolator may include a stem extending radially inward from the elastomer dome of each of the first and second radial isolators, and a stem extending axially from the elastomer dome of the axial isolator. The stem of each of the first and second radial isolators and the stem of the axial isolator are coupled to the shaft.

The first radial isolator of the at least one pair of radial isolators may be oriented opposite to the second radial isolator of the at least one pair of radial isolators. The at least one pair of radial isolators may include a first pair of opposing radial isolators and a second pair of opposing radial isolators. The first pair of opposing radial isolators may be substantially orthogonal to the second pair of opposing radial isolators.

The fluid in the primary chamber and the backpressure chamber of the axial isolator may include oil.

The elastomer domes of the first and second radial isolators and the axial isolator may include silicone elastomer.

The present disclosure is also directed to various embodiments of an isolator configured to isolate a payload from unwanted vibrations and shocks. In one embodiment, the isolator includes a first elastomer dome at least partially defining a first chamber, a second elastomer dome at least partially defining a second chamber, a conduit extending from the first chamber to the second chamber placing the first chamber in fluid communication with the second chamber, a liquid in the first and second chambers, and a shaft configured to be coupled to the payload. The first and second elastomer domes are coupled to the shaft.

The first elastomer dome may be opposite the second elastomer dome. The first elastomer dome may face the second elastomer dome.

The liquid may include oil, such as mineral oil.

Each of the first and second elastomer domes may include silicone elastomer.

The isolator may include a first stem connected to the first elastomer dome and a second stem connected to the second elastomer dome. The first and second stems are coupled to the shaft.

In one or more embodiments, an isolator includes a series of isolators arranged in a three-dimensional configuration. Each isolator of the series of isolators includes a first elastomer member, a first chamber, a second elastomer member, a second chamber, a liquid, such as mineral oil, in the first and second chambers, a conduit extending from the first chamber to the second chamber placing the first chamber in fluid communication with the second chamber, and a shaft configured to be coupled to the payload. The shaft is coupled to at least one of the first and second elastomer members.

The three-dimensional configuration may be a cubic face-centered tetragonal, a square tetragonal, a triangular tetragonal, a sphere, or a hemisphere.

An isolator of the series of isolators may include a two chamber radial isolator, and the first and second elastomer members of the two chamber radial isolator may be coupled to the shaft. The two chamber radial isolator may include first and second stems connected to the first and second elastomer members, respectively, and the first and second stems may be coupled to the shaft.

At least one isolator of the series of isolators may include an axial isolator, and the second elastomer member of the axial isolator may include a backpressure membrane at least partially defining the second chamber.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale. Additionally, the patent or application file contains at least one drawing executed in color. Copies of this patent or patent application publication with color drawing(s) will be provided by the Office upon request and payment of the necessary fee.

FIGS. 1A-1B are a schematic, radial cross-sectional view and a schematic, axial cross-sectional view, respectively, of a two chamber radial isolator according to one embodiment of the present disclosure;

FIG. 6 is a cross-sectional view illustrating two isolators according to one or more embodiments of the present disclosure utilized in a well casing to isolate a sensor chassis from unwanted vibrations.

DETAILED DESCRIPTION

Figure 1C:
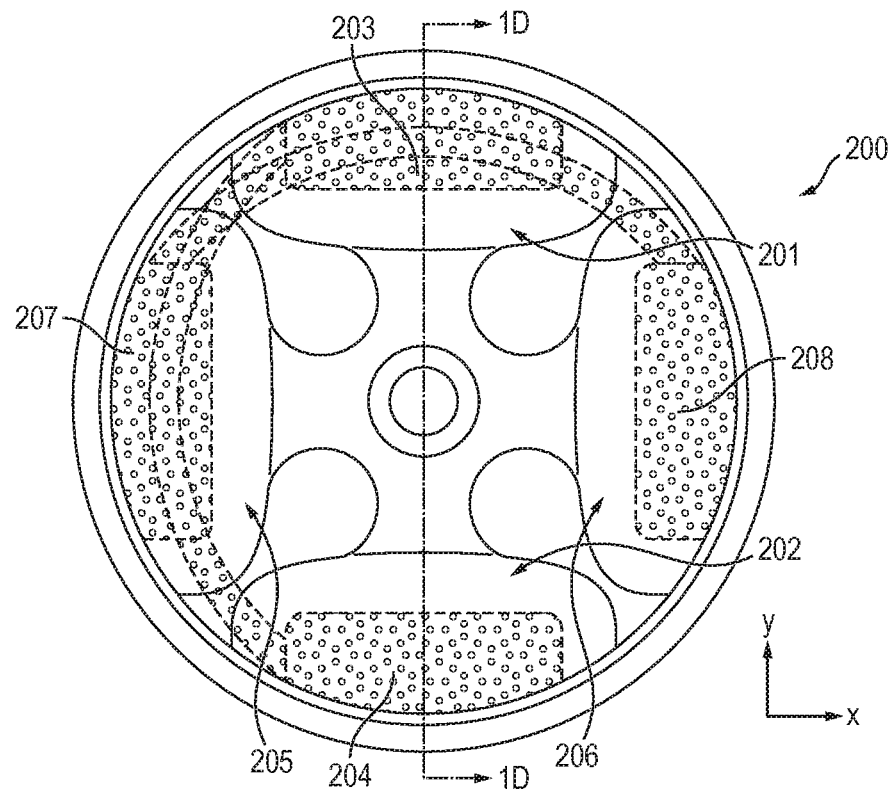
FIGS. 1C-1D are a schematic, radial cross-sectional view and a schematic, axial cross-sectional view, respectively, of a four chamber radial isolator according to one embodiment of the present disclosure.

The present disclosure is directed to various embodiments of an isolator. In one or more embodiments, the isolator is configured to provide both multi-axis elastomeric damping and fluidic damping (e.g., hydraulic damping) to attenuate vibrations and thereby isolate a payload from unwanted vibrations. The isolators of the present disclosure may be utilized to isolate a variety of different payloads, such as a sensor chassis in a hydrocarbon drill well or an electronics suite in a missile, from unwanted vibrations and/or shocks, which might other damage or inhibit proper performance of the payload.

With reference now to FIGS. 1A-1B, a radial isolator 100 according to one embodiment of the present disclosure includes a first chamber 101, a second chamber 102, and a conduit 103 extending from the first chamber 101 to the second chamber 102. The radial isolator 100 also includes a liquid 104 (e.g., an oil such as mineral oil) contained in the first and second chambers 101, 102. The conduit 103 defines a fluid path (e.g., a fluid track) placing the first chamber 101 in fluid communication with the second chamber 102 such that the liquid 104 can flow between the first and second chambers 101, 102.

In the illustrated embodiment, the radial isolator 100 also includes a first elastomer dome 105 at least partially surrounding the first chamber 101 (e.g., the elastomer dome 105 defines at least a portion of the first chamber 101), and a second elastomer dome 106 at least partially surrounding the second chamber 102 (e.g., the second elastomer dome 106 defines at least a portion of the second chamber 102). In the illustrated embodiment, the first and second elastomer domes 105, 106 are each dome-shaped members extending toward each other. In the illustrated embodiment, the first and second elastomer domes 105, 106 each taper radially inward from a relatively wider rim 107, 108 to a relatively narrower trough 109, 110, respectively, although in one or more embodiments the first and second elastomer domes 105, 106 may have any other suitable shape. Additionally, in the illustrated embodiment, a first end of the conduit 103 is connected proximate to a radially outer end of the first elastomer dome 105 (e.g., proximate to the rim 107 of the first elastomer dome 105) and a second end of the conduit 103 is connected proximate to a radially outer end of the second elastomer dome 106 (e.g., proximate to the rim 108 of the second elastomer dome 106).

In the illustrated embodiment, the first elastomer dome 105 is oriented at an angular orientation of approximately 180 degrees with respect to the second elastomer dome 106. That is, in the illustrated embodiment, the first elastomer dome 105 is in-line (e.g., aligned) with the second elastomer dome 106 such that the first elastomer dome 105 is oriented opposite the second elastomer dome 106 (e.g., the first and second elastomer domes 105, 106 face each other). In one or more embodiments, the first and second elastomer domes 105, 106 may be oriented in any other suitable angular orientation relative to each other (e.g., the first and second elastomer domes 105, 106 may be misaligned or offset from each other). In one or more embodiments, the first and second elastomer domes 105, 106 are each made out of a resilient (e.g., elastic) material. In one or more embodiments, the first and second elastomer domes 105, 106 are made out of silicone elastomer (e.g., NUSIL™ 5840). In one or more embodiments, the first and second elastomer domes 105, 106 each have an elastic modulus of approximately 2 MPa. In one or more embodiments, the first and second elastomer domes 105, 106 each have a hardness of 40 Shore A durometer and each have a working temperature range of approximately −65° C. to approximately 240° C.

Additionally, in the illustrated embodiment, the radial isolator 100 also includes a first stem (e.g., a first coupler) 111 connected to the first elastomer dome 105 and extending radially inward from the first elastomer dome 105, and a second stem (e.g., a second coupler) 112 connected to the second elastomer dome 106 and extending radially inward from the second elastomer dome 106. Additionally, in the illustrated embodiment, the first stem 111 is connected to the trough 109 of the first elastomer dome 105 and the second stem 112 is connected to the trough 110 of the second elastomer dome 106. Additionally, in the illustrated embodiment, the first stem 111 is coupled to the second stem 112. In one or more embodiments, the first and second elastomer domes 105, 106, the first and second stems 111, 112, and the conduit 103 may integrally formed as a monolithic member.

With continued reference to the embodiment illustrated in FIGS. 1A-1B, the radial isolator 100 also includes a case or housing 113 housing the first and second elastomer domes 105, 106 and the conduit 103. Although in the illustrated embodiment the housing 113 is cylindrical, in one or more embodiments, the housing 113 may have any other suitable shape depending, for instance, on the environment in which the radial isolator 100 will be utilized. In the illustrated embodiment, the rims 107, 108 of the first and second elastomer domes 105, 106 are coupled (e.g., bonded) to an inner surface 114 (e.g., a cylindrical inner wall) of the housing 113. Together, the inner surface 114 of the housing 113 and the first and second elastomer domes 105, 106 define the first and second chambers 101, 102, respectively. The housing 113 is configured to facilitate attaching the radial isolator 100 to any component or components in an environment in which the radial isolator 100 will be utilized to attenuate unwanted vibrations and/or shocks.

Additionally, in the illustrated embodiment, the radial isolator 100 includes a shaft 115 connected to the stems 111, 112 of the first and second elastomer domes 105, 106. In the illustrated embodiment, the shaft 115 is concentric or substantially concentric with the inner wall (e.g., the cylindrical inner wall) 114 of the housing 113. The shaft 115 is configured to be connected to a payload, and the radial isolator 100 is configured to isolate the payload from unwanted vibrations and/or shocks transmitted to the housing 113 of the radial isolator 100 from a source of vibrations and/or shocks (i.e., the radial isolator 100 is configured to attenuate the transmission of unwanted vibrations and/or shocks from the source to the payload connected to the shaft 115). The payload may be any component or components that is desired to be isolated from unwanted vibrations and/or shocks, such as, for instance, a sensor chassis or an electronics suite, and the source of the vibrations and/or shocks may be any component or components in the environment in which the payload is present, such as, for instance, a missile body or the pressure casing and/or the drill string of a petroleum drill well.

In operation, movement of the housing 113 caused by vibrations and/or a shock transmitted to the housing 113 of the radial isolator 100 causes the elastomer domes 105, 106 to deflect (e.g., deform), which reduces or limits transmission of the vibrations and/or the shock to the payload connected to the shaft 115. That is, the elastomer domes 105, 106 effectively decouple the shaft 115 from the housing 113 to reduce the transmission of vibrations and/or a shock to the payload connected to the shaft 115. In the illustrated embodiment, the elastomer domes 105, 106 are configured to deflect radially (i.e., the +y-direction and the −y-direction in FIG. 1A). The configuration of the elastomer domes 105, 106 (e.g., the geometry of the elastomer domes 105, 106, including the shape, size, and thickness of the elastomer domes 105, 106) and the material properties of the elastomer domes 105, 106 (e.g., the material, hardness, and stiffness of the elastomer domes 105, 106) may be selected depending on the magnitude of the vibrations and/or the shock input to the housing 113 from the vibration source and/or the desired degree of vibrational isolation provided to the payload connected to the shaft 115.

Additionally, when vibrations and/or a shock (or at least a component thereof) is imparted to the housing 113 along the radial direction of the housing 113 along which at least one of the first and second elastomer domes 105, 106 is oriented, at least a portion of one of the first and second elastomer domes 105, 106 deflects radially in the opposite direction. For example, when vibrations and/or a shock (or at least a component thereof) is imparted to the housing 113 along the negative y-direction in FIG. 1A, at least a portion of the first elastomer dome 105 deflects in the positive y-direction in FIG. 1A. The deflection of the first elastomer dome 105 in the radial direction (e.g., the positive y-direction) reduces the volume of the first chamber 101 and thereby increases the pressure of the liquid 104 in the first chamber 101. A volume of liquid 104 in the first chamber 101 corresponding to the volume of liquid 104 in the first chamber 101 that was displaced by the deflection or deformation of the first elastomer dome 105 is forced through the conduit 103 into the second chamber 102. In this manner, the first elastomer dome 105 is configured to function as a piston to pump a volume of the fluid 104 in the first chamber 101 to the second chamber 102 through the conduit 103 in response to vibrations and/or a shock imparted to the housing 113 of the radial isolator 100.

The second elastomer dome 106 is configured to deflect and/or deform in the radial direction (e.g., the positive y-direction in FIGS. 1A-1B) in response to the influx of additional liquid 104 into the second chamber 102 (e.g., the second elastomer dome 106 is configured to expand radially, which increases the size of the second chamber 102 to accommodate the influx of additional liquid 104). The deflection and/or deformation of the second elastomer dome 106 in the radial direction due to the influx of an additional volume of the liquid 104 into the second chamber 102 provides fluidic damping (e.g., hydraulic damping) along the radial direction (e.g., the y-axis in FIGS. 1A-1B).

Additionally, in the illustrated embodiment, the cross-sectional size of the conduit 103 is smaller than the cross-sectional size of each of the first and second chambers 101, 102 such that the conduit 103 restricts the flow of the liquid 104 between the first chamber 101 and the second chamber 102. This restriction of the liquid flow through the conduit 103 is configured to provide fluidic damping to limit the transmission of vibrations and/or shock to the payload connected to the shaft 115. The configuration (e.g., shape and size) of the conduit 103 may be selected depending on the magnitude of the vibrations and/or shock input to the housing 113 from the vibration source and/or the desired level of fluidic damping.

Additionally, the deflection and/or deformation of the second elastomer dome 106, which is formed of a resilient (e.g., elastic) material, generates a restorative force in a radial direction (i.e., the negative y-direction in FIG. 1A) opposite to the direction in which the second elastomer dome 106 was deflected and/or deformed. This restorative force is configured to force (e.g., pump) a volume of the liquid 104 in the second chamber 102 back through the conduit 103 into the first chamber 101. The restorative force supplied by the deflected second elastomer dome 106 is configured to force a volume of the liquid 104 into the first chamber 101 through the conduit 103 until the pressure of the liquid 104 in the first chamber 101 substantially equals the pressure of the liquid 104 in the second chamber 102 (i.e., the deflection and/or deformation of the second elastomer dome 106 is configured to change the pressure of the liquid 104 in the second chamber 102 until a pressure equilibrium is reached between the liquid 104 in the first chamber 101 and the second chamber 102). This cycle of pumping the liquid 104 between the first chamber 101 and the second chamber 102 through the conduit 103 may continue as long as unwanted vibrations and/or shock are input to the housing 113 of the radial isolator 100 in order to provide fluidic damping to attenuate the transmission of the vibrations and/or the shocks to the isolated payload coupled to the shaft 115.

The first and second elastomer domes 105, 106 are configured to function in the opposite manner when vibrations and/or a shock (or at least a component thereof) is imparted to the housing 113 in the opposite radial direction along which at least one of the first and second elastomer domes 105, 106 is oriented. For instance, in the illustrated embodiment, when vibrations and/or a shock (or at least a component thereof) is imparted to the housing 113 along the positive y-direction in FIG. 1A, at least a portion of the second elastomer dome 106 deflects in the negative y-direction in FIG. 1A, which causes a volume of the liquid 104 to be pumped from the second chamber 102 to first chamber 101 through the conduit 103. The influx of additional liquid 104 into the first chamber 101 causes the first elastomer dome 101 to expand radially, which creates a restorative force in an opposite radial direction that is configured to force a volume of the liquid 104 into the second chamber 102 through the conduit 103 until the pressure of the liquid 104 in the first chamber 101 substantially equals the pressure of the liquid 104 in the second chamber 102.

Accordingly, the embodiment of the radial isolator 100 illustrated in FIG. 1A is configured to provide both radial translational vibration isolation due to the first and second elastomer domes 105, 106 being coupled between the housing 113 and the shaft 115, and fluidic damping (e.g., hydraulic damping) along the radial direction (e.g., along the y-axis in FIG. 1A) due to the pumping of the fluid between the first and second chambers 101, 102 through the conduit 103.

Although in the embodiment illustrated in FIG. 1A the radial isolator 100 is a dual-chamber isolator (i.e., the radial isolator 100 includes two chambers 101, 102), in one or more embodiments, the radial isolator 100 may have any other suitable number of chambers depending, for instance, on the orientation and/or the magnitude of the vibrations and/or shocks from which the radial isolator 100 is configured isolate the payload coupled to the shaft 115.

Figure 1D:
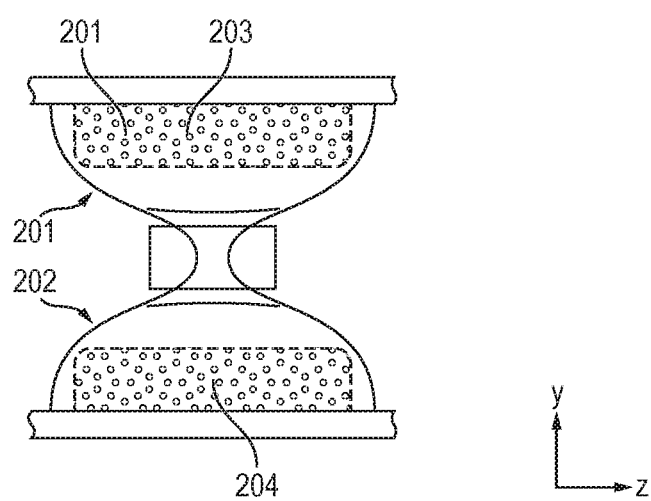

For instance, FIGS. 1C-1D illustrate an embodiment of a four-chamber radial isolator 200. In the embodiment illustrated in FIGS. 1C-1D, the radial isolator 200 includes a first pair of opposing elastomer domes 201, 202 at least partially defining a first pair of opposing chambers 203, 204, respectively, and a second pair of elastomer domes 205, 206 at least partially defining a second pair of opposing chambers 207, 208, respectively. In the illustrated embodiment, the first pair of elastomer domes 201, 202 and the first pair of chambers 203, 204 are oriented at an angular orientation of approximately 90 degrees with respect to the second pair of elastomer domes 205, 206 and the second pair of chambers 207, 208 (i.e., the first pair of elastomer domes 201, 202 is orthogonal or substantially orthogonal to the second pair of elastomer domes 205, 206). In one or more embodiments, the first pair of elastomer domes 201, 202 may have any other suitable angular orientation relative to the second pair of elastomer domes 205, 206 depending, for instance, on the orientation and/or the magnitude of the vibrations and/or shocks from which the radial isolator 200 is configured isolate the payload.

Figure 2:
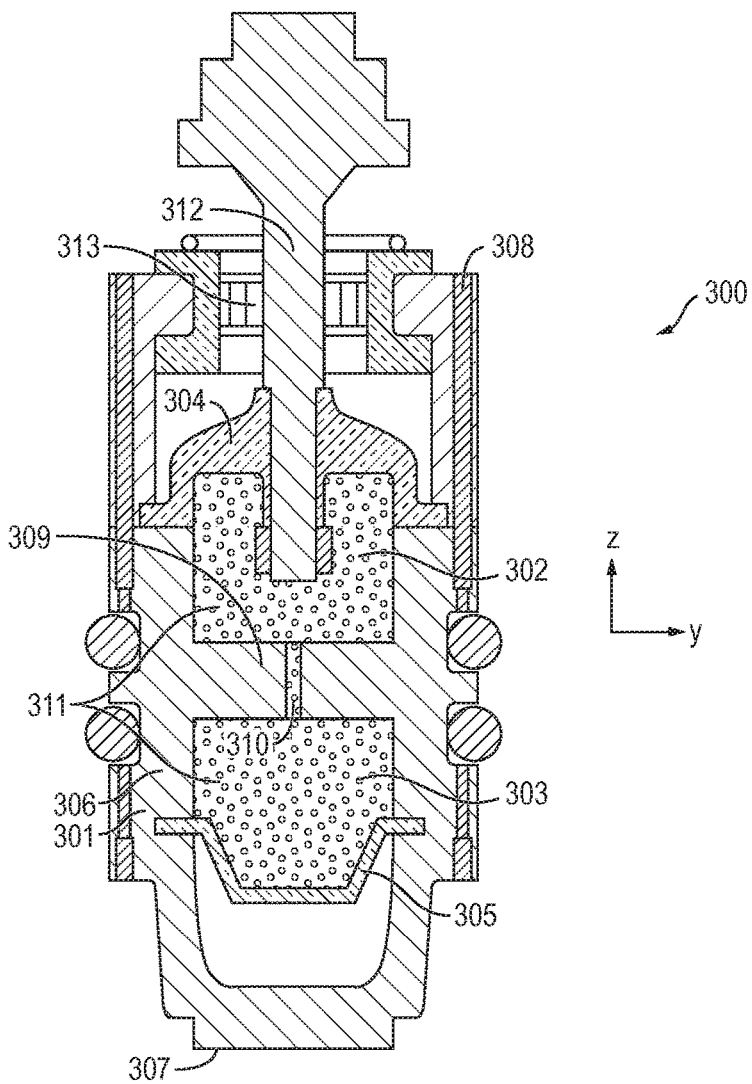
FIG. 2 is a schematic cross-sectional view of an axial isolator according to another embodiment of the present disclosure.

With reference now to FIG. 2, an axial isolator 300 according to one embodiment of the present disclosure includes a case or a housing 301, a primary isolation chamber 302 in the housing 301, a backpressure chamber 303 in the housing 303, an elastomer dome 304 in the housing 301, and a backpressure membrane 305 in the housing 301. In the illustrated embodiment, the elastomer dome 304 and the backpressure membrane 305 are each dome-shaped members extending in opposite directions away from each other. In one or more embodiments, the backpressure membrane 305 may have any other suitable shape (e.g., the backpressure membrane 305 may not be dome-shaped). In one or more embodiments, the elastomer dome 304 and the backpressure membrane 305 are each made out of a resilient (e.g., elastic) material (e.g., silicone elastomer). In one or more embodiments, the backpressure membrane 305 is made out of silicone elastomer (e.g., NUSIL™ 5840). In one or more embodiments, the backpressure membrane 305 has a hardness of 40 Shore A durometer and has a working temperature range of approximately −65° C. to approximately 240° C. In the illustrated embodiment, the housing 301 includes a sidewall 306 (e.g., a cylindrical sidewall) extending between a first end 307 of the housing 301 and a second end 308 of the housing 301 opposite the first end 307. Although in the illustrated embodiment the housing 301 is generally cylindrical, in one or more embodiments the housing 301 may have any other shape suitable for the environment in which the isolator 300 is intended to be utilized to attenuate unwanted vibrations and/or shock. In the illustrated embodiment, the backpressure chamber 303 is proximate to the first end 307 of the housing 301 and the primary isolation chamber 302 is proximate to the second end 308 of the housing 301.

With continued reference to the embodiment illustrated in FIG. 2, the housing 301 includes a wall or partition 309 connected to the sidewall 306. The partition 309 is positioned at an intermediate position between the first and second ends 307, 308 of the housing 301. The partition 309 separates the backpressure chamber 303 from the primary isolation chamber 302. Additionally, in the illustrated embodiment, the partition 309 defines an opening 310 (e.g., a conduit) placing the primary isolation chamber 302 in fluid communication with the backpressure chamber 303. In the illustrated embodiment, the primary isolation chamber 302 is defined between the elastomer dome 304, the partition 309, and a portion of the sidewall 306 proximate to the second end 308 of the housing 301. In the illustrated embodiment, the backpressure chamber 303 is defined between the backpressure membrane 305, the partition 309, and a portion of the sidewall 306 proximate to the first end 307 of the housing 301.

With continued reference to the embodiment illustrated in FIG. 2, the isolator 300 includes a volume of liquid 311 in the primary isolation chamber 302 and the backpressure chamber 303. In one or more embodiments, the liquid 311 contained in the primary isolation chamber 302 and the backpressure chamber 303 is oil (e.g., a high viscosity oil such as high viscosity mineral oil).

In the illustrated embodiment, the first end 307 of the housing 301 is configured to be connected to a vibration source (e.g., a drill string). In one or more embodiments, an outer surface of the sidewall 306 at the first end 307 includes external threads and/or the first end 307 of the housing 301 may define a series of internally threaded openings configured to accommodate fasteners coupling the isolator 300 to the vibration source.

With continued reference to the embodiment illustrated in FIG. 2, the isolator 300 also includes a shaft 312 connected to the elastomer dome 304. In the illustrated embodiment, the shaft 312 is connected to the housing 301 by the elastomer dome 304. In the illustrated embodiment, the shaft 312 extends out through an opening 313 in the second end 308 of the housing 301. The shaft 312 is configured to be connected to a payload, and the isolator 300 is configured to isolate the payload from unwanted vibrations and/or shocks transmitted to the housing 301 from the vibration source (i.e., the isolator 300 is configured to attenuate the transmission of unwanted vibrations from the vibration source to the payload connected to the shaft 312).

In operation, movement of the housing 301 caused by vibrations and/or a shock transmitted to the housing 301 of the isolator 300 causes the elastomer dome 304 to deflect (e.g., deform), which reduces or limits transmission of the vibrations and/or the shock to the payload connected to the shaft 312. That is, the deformable elastomer dome 304 effectively decouples the shaft 312 from the housing 301 to reduce the transmission of vibrations and/or shock to the payload connected to the shaft 312. In the illustrated embodiment, the elastomer dome 304 is configured to deflect both radially (i.e., the y-direction in FIG. 2) and axially (i.e., the z-direction in FIG. 2) to provide vibration isolation in all translational directions. In this manner, the elastomer dome 304 is configured to provide multi-axis damping to attenuate the transmission of the vibrations to the isolated payload through the shaft 312. In the illustrated embodiment, the elastomer dome 304 is also configured to deflect rotationally about the axial direction (i.e., rotationally around the z-axis in FIG. 2) to provide vibration isolation in a rotational direction. The configuration of the elastomer dome 304 (e.g., the geometry of the elastomer dome 304, including the shape, size, and thickness of the elastomer dome 304) and the material properties of the elastomer dome 304 (e.g., the material, hardness, and stiffness of the elastomer dome 304) may be selected depending on the magnitude of the vibrations and/or the shock input to the housing 301 from the vibration source and/or the desired degree of vibrational isolation provided to the payload connected to the shaft 312.

Additionally, when vibrations and/or a shock (or at least a component thereof) is imparted to the housing 301 along the axial direction of the housing 301 (i.e., the +z-direction in FIG. 2), at least a portion the elastomer dome 304 deflects axially in the direction of the first end 307 of the housing 301. The deflection of the elastomer dome 304 in the direction of the first end 307 of the housing 301 reduces the volume of the primary isolation chamber 302 and thereby increases the pressure of the liquid 311 in the primary isolation chamber 302. A volume of liquid 311 in the primary isolation chamber 302 corresponding to the volume of liquid 311 in the primary isolation chamber 302 that was displaced by the deflection or deformation of the elastomer dome 304 is forced through the opening 310 (e.g., the conduit) in the partition 309 into the backpressure chamber 303. In this manner, the elastomer dome 304 is configured to function as a piston to pump a volume of the liquid 311 in the primary isolation chamber 302 to the backpressure chamber 303 through the opening 310 in response to vibrations and/or a shock imparted to the housing 301 of the isolator 300.

The backpressure membrane 305 is configured to deflect and/or deform (e.g., in the direction of the first end 307 of the housing 301) in response to the influx of additional liquid 311 into the backpressure chamber 303 (e.g., the backpressure membrane 305 is configured to expand axially in the direction of the first end 307 of the housing 301, which increases the size of the backpressure chamber 303 to accommodate the influx of additional liquid 311). The deflection or deformation of the backpressure membrane 305 in the axial direction (i.e., the negative z-direction in FIG. 2) toward the first end 307 of the housing 301 due to the influx of an additional volume of liquid 311 into the backpressure chamber 303 provides fluidic damping (e.g., hydraulic damping) along the axial direction (i.e., the z-axis in FIG. 2) of the shaft 312.

Additionally, in the illustrated embodiment, the cross-sectional size of the opening 310 in the partition 309 (e.g., the conduit) is smaller than the cross-sectional size of the chambers 302, 303 such that the opening 310 restricts the flow of the fluid between the primary chamber 302 and the backpressure chamber 303. This restriction of the liquid flow through the opening 310 is configured to provide fluidic damping to limit the transmission of vibrations and/or shock to the payload connected to the shaft 312. The configuration (e.g., shape and size) of the opening 310 in the partition 309 may be selected depending on the magnitude of the vibrations and/or shock input to the housing 301 from the vibration source and/or the desired level of fluidic damping. In one or more embodiments, the stiffness of the elastomer dome 304 is sufficiently soft to provide multi-axis damping, but stiff enough to pump a volume of the liquid 311 from the primary isolation chamber 302 to the backpressure chamber 303 through the opening 310 in the partition 309.

Additionally, the deflection and/or deformation of the backpressure membrane 305, which is formed of a resilient (e.g., elastic) material, generates a restorative force in an axial direction (i.e., the positive z-direction in FIG. 2) opposite to the direction in which the backpressure membrane 305 was deflected and/or deformed. This restorative force is configured to force (e.g., pump) a volume of the liquid 311 in the backpressure chamber 303 back through the opening 310 in the partition 309 into the primary isolation chamber 302. The restorative force supplied by the deflected backpressure membrane 305 is configured to force a volume of the liquid 311 into the primary isolation chamber 302 through the opening 310 until the pressure of the liquid 311 in the primary isolation chamber 302 substantially equals the pressure of the liquid 311 in the backpressure chamber 303 (i.e., the deflection and/or deformation of the backpressure membrane 305 is configured to change the pressure of the liquid 311 in the backpressure chamber 303 until a pressure equilibrium is reached between the liquid 311 in the primary isolation chamber 302 and the backpressure chamber 303). This cycle of pumping the liquid 311 between the primary isolation chamber 302 and the backpressure chamber 303 through the opening 310 in the partition 309 may continue as long as unwanted vibrations and/or shock are input to the housing 301 of the isolator 300 in order to provide fluidic damping to attenuate the transmission of the vibrations and/or the shocks to the isolated payload.

Accordingly, the embodiment of the isolator 300 illustrated in FIG. 2 is configured to provide both multi-axis isolation (e.g., translational and rotational isolation) due to the elastomer dome 304 being coupled between the housing 301 and the shaft 312, and fluidic damping (e.g., hydraulic damping) along the axial direction (i.e., the z-axis in FIG. 2) due to the pumping of the liquid 311 between the chambers 302, 303 through the opening 310 (e.g., the conduit) in the partition 309.

One or more of the radial isolators 100, 200 and/or one or more of the axial isolators 300 of the present disclosure may be combined into a multi-axis isolator assembly. FIGS. 3A-3D are schematic illustrations of various configurations of the radial isolators 100, 200 and/or the axial isolators 300 in a multi-axis isolator assembly according to various embodiments of the present disclosure. In the embodiment illustrated in FIG. 3A, a multi-axis isolator assembly 400 includes a rectilinear arrangement or configuration of a series of isolators 401 (e.g., cubic face-centered tetragonal arrangement of isolators 401). In one or more embodiments, the isolators 401 may include three pairs of opposing axial isolators 300 according to the embodiment illustrated in FIG. 2 (e.g., one pair of opposing axial isolators 300 oriented along the y-axis, one pair of opposing axial isolators 300 oriented along the x-axis, and one pair of opposing axial isolators 300 oriented along the z-axis). In one or more embodiments, the isolators 401 may include three dual-chamber radial isolators 300 according to the embodiment illustrated in FIG. 1A (e.g., one dual-chamber radial isolator 300 oriented along the y-axis, one dual-chamber radial isolator 300 oriented along the x-axis, and one dual-chamber radial isolator 300 oriented along the z-axis).

Figures 3A, 3B, 3C, 3D:
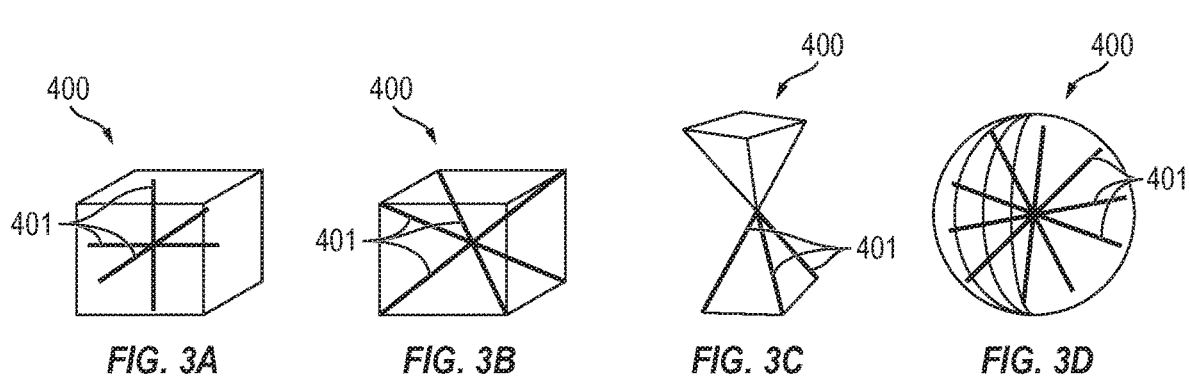
FIGS. 3A-3D illustrate various three-dimensional configurations of a multi-axis isolator incorporating two or more isolators according to the embodiment illustrated in FIG. 1 and/or the embodiment illustrated in FIG. 2.

In the embodiment illustrated in FIG. 3B, the multi-axis isolator assembly 400 includes a square tetragonal (i.e., cubic diagonal) arrangement of a series of isolators 401. In one or more embodiments, the isolators 401 in FIG. 3B may include three dual-chamber radial isolators 100 according to the embodiment illustrated in FIG. 1A oriented along the diagonals of cuboid.

In the embodiment illustrated in FIG. 3C, the multi-axis isolator assembly 400 includes a triangular tetragonal arrangement of a series of isolators 401. In one or more embodiments, the isolators 401 in FIG. 3C may include three axial isolators 300 according to the embodiment illustrated in FIG. 2 oriented along the edges of a tetrahedron. In the illustrated embodiment, the shafts 312 of the axial isolators 300 are coupled together at the apex of the tetrahedron.

In the embodiment illustrated in FIG. 3D, the multi-axis isolator assembly 400 includes a series of isolators 401 arranged with spherical symmetry. In one or more embodiments, the isolators 401 in FIG. 3D may include a series of radial isolators 100 or 200 according to the embodiment illustrated in FIG. 1A or 1B oriented along radial lines of an imaginary sphere (e.g., opposite ends of each of the radial isolators 100 or 200 may by located at opposite points on the surface of the imaginary sphere). In the illustrated embodiment, the shafts 108 of the radial isolators 100 or 200 are coupled together at the center of the sphere. In one or more embodiments, the isolators 401 in FIG. 3D may be axial isolators 300 oriented along the radial lines of the sphere (e.g., one end of each of the radial isolators 100 or 200 may lie on the surface of an imaginary sphere and opposite ends of each of the radial isolators 100 or 200 may be at the center of the imaginary sphere). The shafts 312 of the axial isolators 300 may be coupled together at the center of the sphere. In one or more embodiments, the isolators 401 of the multi-axis isolator assembly 400 may be arranged with hemispherical symmetry. In one or more embodiments in which the isolators 401 are arranged with hemispherical symmetry, the isolators 401 may include a series of axial isolators 300 oriented along the radial lines of the hemisphere, and the shafts 312 of the axial isolators 300 may be coupled together at the center of the hemisphere.

Figure 4A:
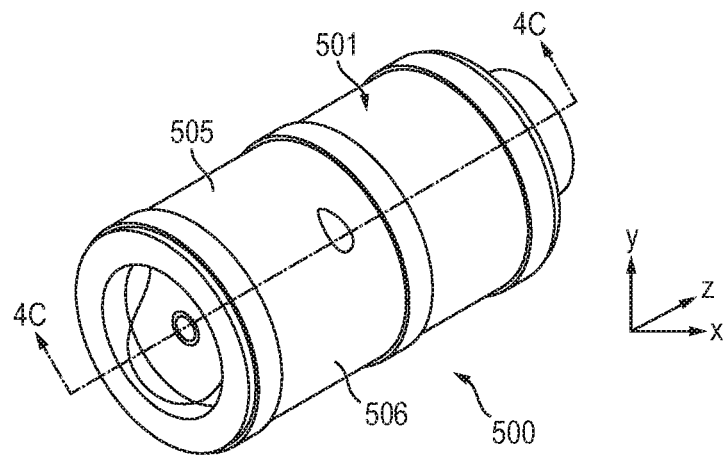
FIGS. 4A-4C are a perspective view, a front view, and a cross-sectional view, respectively, of a multi-axis isolator according to one embodiment of the present disclosure including both a radial isolator and an axial isolator.
Figure 4B:
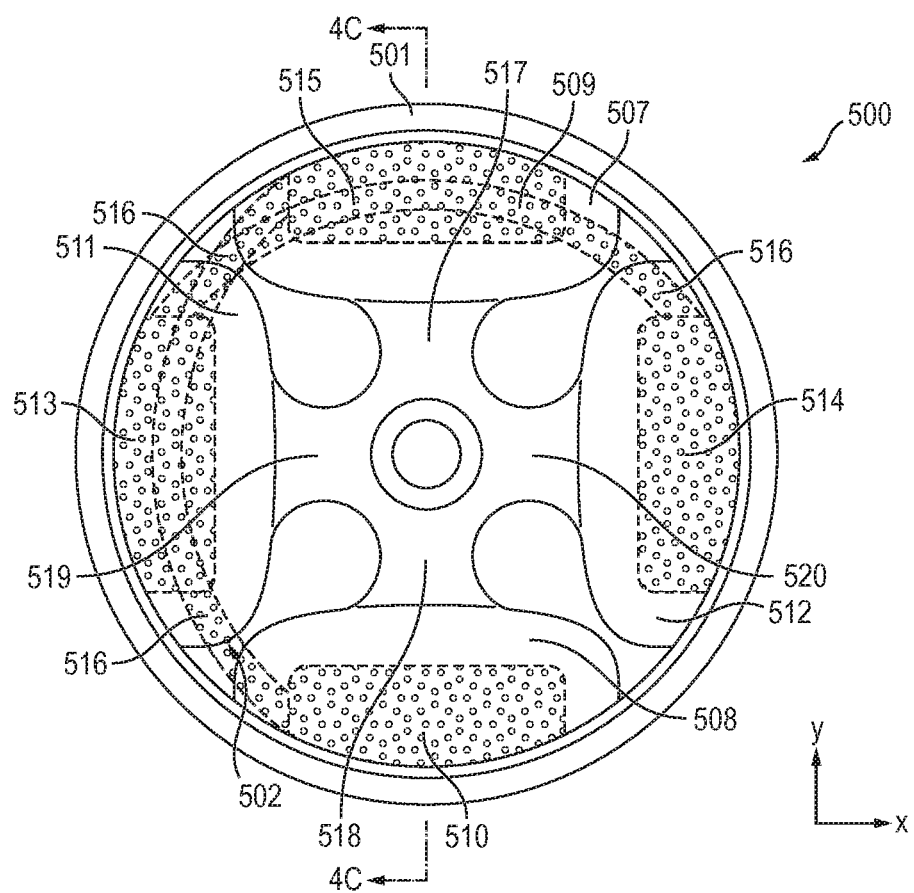
Figure 4C:
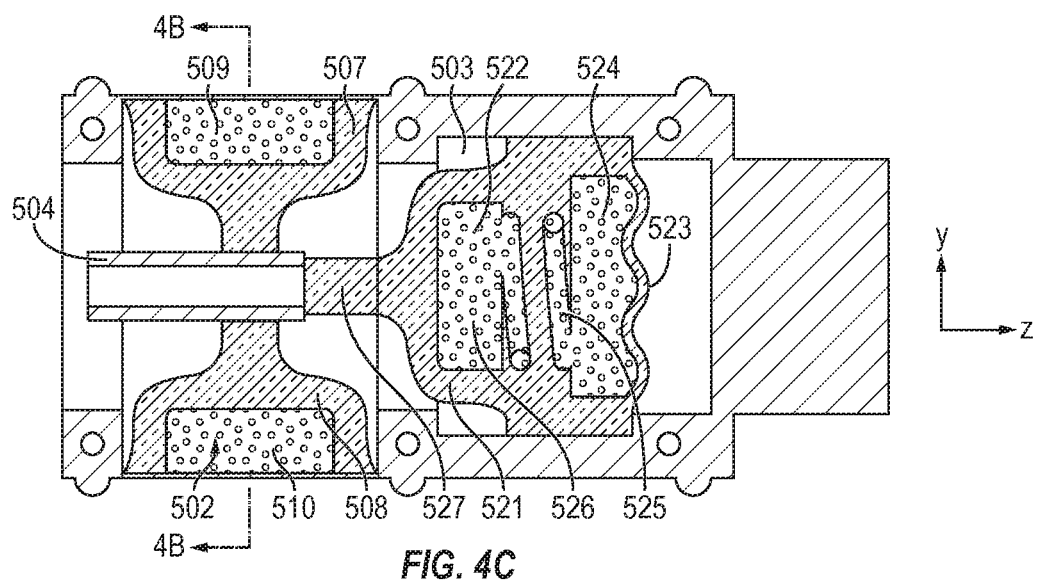

With reference now to FIGS. 4A-4C, a multi-axis isolator 500 according to one embodiment of the present disclosure includes a case or a housing 501, a four-chamber radial isolator 502 housed in the housing 501, an axial isolator 503 housed in the housing 501, and a shaft 504 coupled to the radial isolator 502 and the axial isolator 503. The shaft 504 is configured to be coupled to a payload that the multi-axis isolator 500 is configured to isolate from unwanted vibrations and/or shocks. In the illustrated embodiment, the housing 501 includes a first shell 505 (e.g., a first half) configured to be detachably coupled to a second shell 506 (e.g., a second half).

In the illustrated embodiment, the four-chamber radial isolator 502 includes a first pair of opposing elastomer domes 507, 508 at least partially defining a first pair of opposing chambers 509, 510, and a second pair of opposing elastomer domes 511, 512 at least partially defining a second pair of opposing chambers 513, 514. In the illustrated embodiment, the first pair of opposing elastomer domes 507, 508 and the first pair of chambers 509, 510 are oriented at an angular orientation of approximately 90 degrees with respect to the second pair of opposing elastomer domes 511, 512 and the second pair of opposing chambers 513, 514 (i.e., the first pair of opposing elastomer domes 507, 508 is orthogonal or substantially orthogonal to the second pair of opposing elastomer domes 513, 514). In one or more embodiments, the first pair of elastomer domes 509, 510 may have any other suitable angular orientation relative to the second pair of elastomer domes 513, 514.

The four-chamber radial isolator 502 also includes a liquid 515 (e.g., an oil such as mineral oil) contained in the first and second pairs of chambers 509, 510, 513, 514. Additionally, in the illustrated embodiment, the four-chamber radial isolator 502 also includes a conduit 516 connected to the elastomer domes 507, 508, 511, 512. The conduit 516 defines a fluid path (e.g., a fluid track) placing the chambers 509, 510, 513, 514 in fluid communication with each other such that the liquid 515 can flow between the chambers 509, 510, 513, 514.

With continued reference to the embodiment illustrated in FIGS. 4A-4C, the four-chamber radial isolator 502 also includes a first pair of stems 517, 518 (e.g., a first pair of couplers) connected to the first pair of elastomer domes 507, 508, respectively, and extending radially inward from the first pair of elastomer domes 507, 508, and a second pair of stems 519, 520 (e.g., a second pair of couplers) connected to the second pair of elastomer domes 511, 512 and extending radially inward from the second pair of elastomer domes 511, 512. Additionally, in the illustrated embodiment, the first and second pairs of stems 517, 518, 519, 520 are coupled to the shaft 504. In one or more embodiments, the four-chamber radial isolator 502 may be the same as or similar to the embodiment of the four-chamber radial isolator 200 described above with reference to FIG. 1B.

As described above with reference to the embodiment of the radial isolator 100 illustrated in FIG. 1A, the four-chamber radial isolator 502 is configured to provide both radial and translational vibration isolation due to the elastomer domes 507, 508, 511, 512 being coupled between the housing 501 and the shaft 504, and fluidic damping (e.g., hydraulic damping) along the radial direction (e.g., along the y-axis and the x-axis in FIGS. 4A-4C) due to the pumping of the fluid between the chambers 509, 510, 513, 514 through the conduit 516.

Although in the illustrated embodiment the multi-axis isolator 500 includes a four-chamber radial isolator 502, in one or more embodiments the multi-axis isolator 500 may include a radial isolator with any other suitable number of chambers, such as, for instance two chambers (i.e., the multi-axis isolator 500 may include a dual-chamber radial isolator) or more than two chambers (e.g., three chambers or more). For instance, in one or more embodiments, the multi-axis isolator 500 may include a dual-chamber isolator that is the same as or similar to the embodiment of the dual-chamber isolator 100 illustrated in FIG. 1A.

With continued reference to the embodiment illustrated in FIGS. 4A-4C, the axial isolator 503 includes an elastomer dome 521 at least partially defining a primary isolation chamber 522, a backpressure membrane 523 at least partially defining a backpressure chamber 524, and a conduit 525 extending between the primary isolation chamber 522 and the backpressure chamber 524. The axial isolator 503 also includes a liquid 526 (e.g., an oil such as mineral oil) contained in the primary isolation chamber 522 and the backpressure chamber 524. The conduit 525 defines a fluid path (e.g., a fluid track) placing the primary and backpressure chambers 522, 524 in fluid communication with each other such that the liquid 526 can flow between the chambers 522, 524. In the illustrated embodiment, the axial isolator 503 also includes a stem 527 (e.g., a coupler) connected to the elastomer dome 521 and extending axially (e.g., the z-axis in FIGS. 4A-4C) in a direction away from the backpressure membrane 523 and toward the four-chamber radial isolator 502. The stem 527 of the axial isolator 503 is coupled to the shaft 504. Additionally, in the illustrated embodiment, the stem 527 is axially aligned with the shaft 504. In one or more embodiments, the axial isolator 503 may be the same as or similar to the embodiment of the axial isolator 300 illustrated in FIG. 2.

As described above with reference to the embodiment of the axial isolator 200 illustrated in FIG. 2, the axial isolator 503 is configured to provide both multi-axis isolation (e.g., translational and rotational isolation) due to the elastomer dome 507, 508 being coupled between the housing 501 and the shaft 504, and fluidic damping (e.g., hydraulic damping) along the axial direction (i.e., the z-axis in FIGS. 4A-4C) due to the pumping of the liquid 526 between the chambers 522, 524 through the conduit.

In one or more embodiments, the multi-axis isolator 500 has an axial travel limit (e.g., the axial isolator 503 has a maximum axial travel) of +/−0.25 inch or approximately +/−0.25 inch along the z-axis, and the multi-axis isolator 500 has a radial or lateral travel limit (e.g., the four-chamber radial isolator 502 has a maximum radial travel) of +/−0.25 inch or approximately +/−0.25 inch along the y-axis and along the x-axis.

In one or more embodiments, the multi-axis isolator 500 may be manufactured by detaching and separating the first shell 505 of the housing 501 from the second shell 506 of the housing 501. A primer may then be applied to inner surfaces of the first and second shells 505, 506 of the housing 501. The primer is configured to bond the radial isolator 502 and the axial isolator 503, which are formed during subsequent tasks described below, to the housing 501. Molds, such as ABS plastic 3-D printed molds, may then be attached to the first and/or second shells 505, 506 of the housing 501, and then the first shell 505 may be reattached to the second shell 506 of the housing 501. The molds have a size and shape corresponding to the desired size and shape of the elastomer domes 507, 508, 511, 512, 521, the backpressure membrane 523, the chambers 509, 510, 513, 514, 522, 524, the stems 517, 518, 519, 520, 527, and the conduits 516, 525 of the radial isolator 502 and the axial isolator 503. Silicone may then be poured into the molds, and then the silicone may be cured to form the elastomer domes 507, 508, 511, 512, 521, the backpressure membrane 523, the chambers 509, 510, 513, 514, 522, 524, the stems 517, 518, 519, 520, 527, and the conduits 516, 525 of the radial isolator 502 and the axial isolator 503. In one or more embodiments, the housing 501 may then be submerged in acetone, which dissolves the molds (e.g., the ABS molds), but leaves the elastomer domes 507, 508, 511, 512, 521, the backpressure membrane 523, the stems 517, 518, 519, 520, 527, and the conduits 516, 525 of the radial isolator 502 and the axial isolator 503 intact. The chambers of the radial isolator and the axial isolator may then be filled with a fluid (e.g., mineral oil). For instance, in one or more embodiments, the fluid may be poured into the chambers 509, 510, 513, 514, 522, 524 of the radial isolator 502 and the axial isolator 503 through one or more ports in the housing 501. In one or more embodiments, the housing 501 may be submerged in a vat of fluid such that the fluid is permitted to flow through the one or more ports in the housing 501 and into the chambers 509, 510, 513, 514, 522, 524. Additionally, in one or more embodiments, the process of manufacturing the multi-axis isolator 500 may include removing any air bubbles trapped inside the chambers 509, 510, 513, 514, 522, 524 and/or the conduits 516, 525 of the radial isolator 502 and/or the axial isolator 503.

Figure 5A:
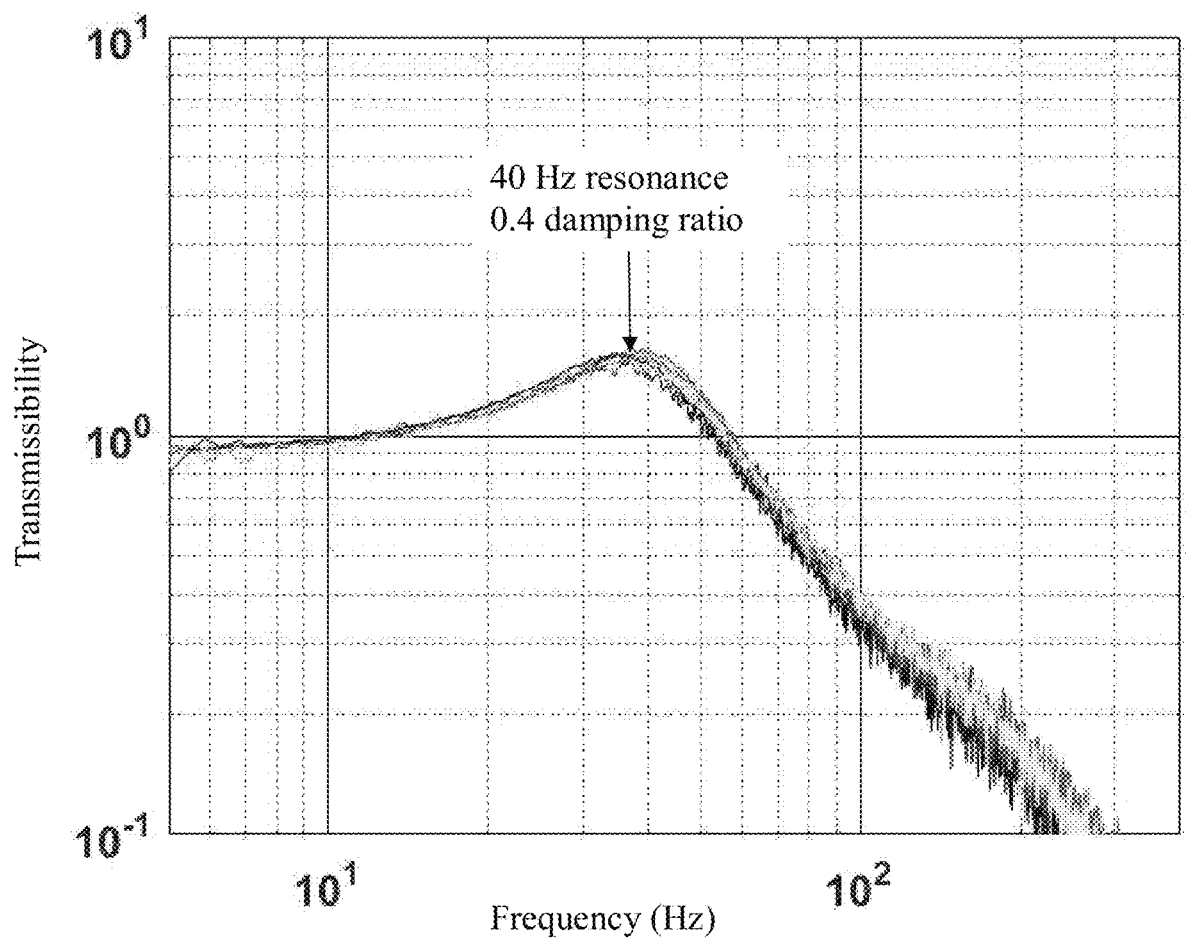
FIGS. 5A-5C are graphs depicting the transmissibility of vibrations through the embodiment of the axial isolator illustrated in FIG. 2, the embodiment of the two chamber radial isolator illustrated in FIG. 1A, and the embodiment of the four chamber radial isolator illustrated in FIG. 1B, respectively.

FIG. 5A depicts the transmissibility of vibrations through the embodiment of the axial isolator 300 depicted in FIG. 2 as a function of the vibration frequency. In the illustrated embodiment, the axial isolator 300 has a relatively low resonant frequency from approximately 30 Hz to approximately 40 Hz or less and a damping ratio of approximately 0.4. In one or more embodiments, the axial isolator 300 may have any other damping ratio suitable for the environment in which the axial isolator 300 is intended to be utilized and/or the nature of the isolated payload, such as, for instance, a damping ratio greater than approximately 0.4 or less than approximately 0.4. An axial isolator 300 according to one or more embodiments of the present disclosure was tested by subjecting the axial isolator 300 to vibration levels up to approximately 18 $g_{rms}$ at frequencies from approximately 20 Hz to approximately 200 Hz. The tested axial isolator 300 achieved a travel of approximately +/−0.25 inches in the axial and radial directions, which demonstrates that the isolator provided adequate damping of unwanted vibrations under these conditions. In one or more embodiments, the isolator is configured to provide adequate damping of unwanted vibrations in payload masses ranged from approximately 1 kg to approximately 10 kg or more.

Figure 5B:
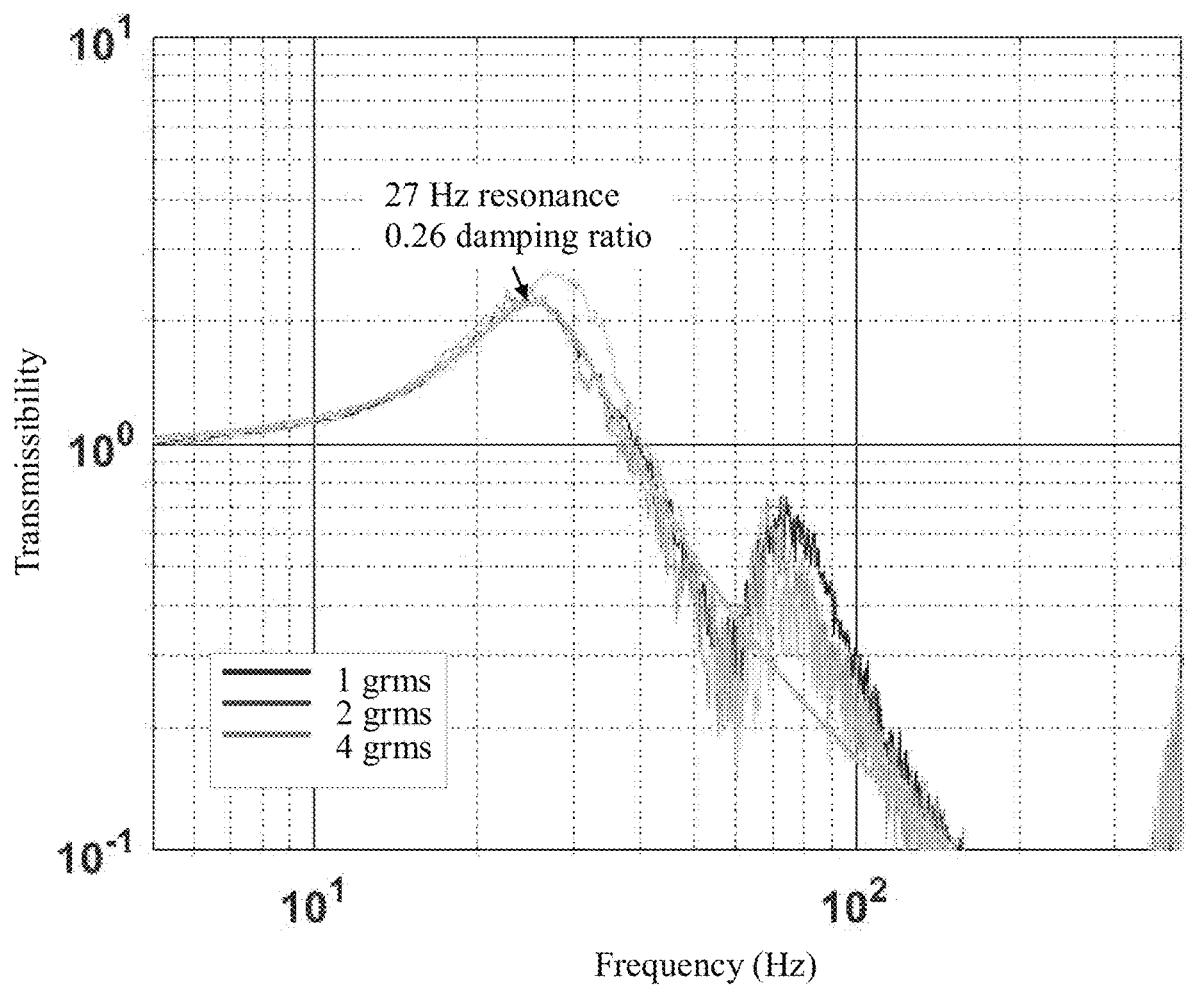

FIG. 5B depicts the transmissibility of vibrations through the embodiment of the dual-chamber radial isolator 100 depicted in FIG. 1A as a function of the vibration frequency. In the illustrated embodiment, the dual-chamber radial isolator 100 has a relatively low resonant frequency of approximately 27 Hz or less and a damping ratio of approximately 0.26. In one or more embodiments, the dual-chamber radial isolator 100 may have any other damping ratio suitable for the environment in which the dual-chamber radial isolator 100 is intended to be utilized and/or the nature of the isolated payload, such as, for instance, a damping ratio greater than approximately 0.26 or less than approximately 0.26.

Figure 5C:
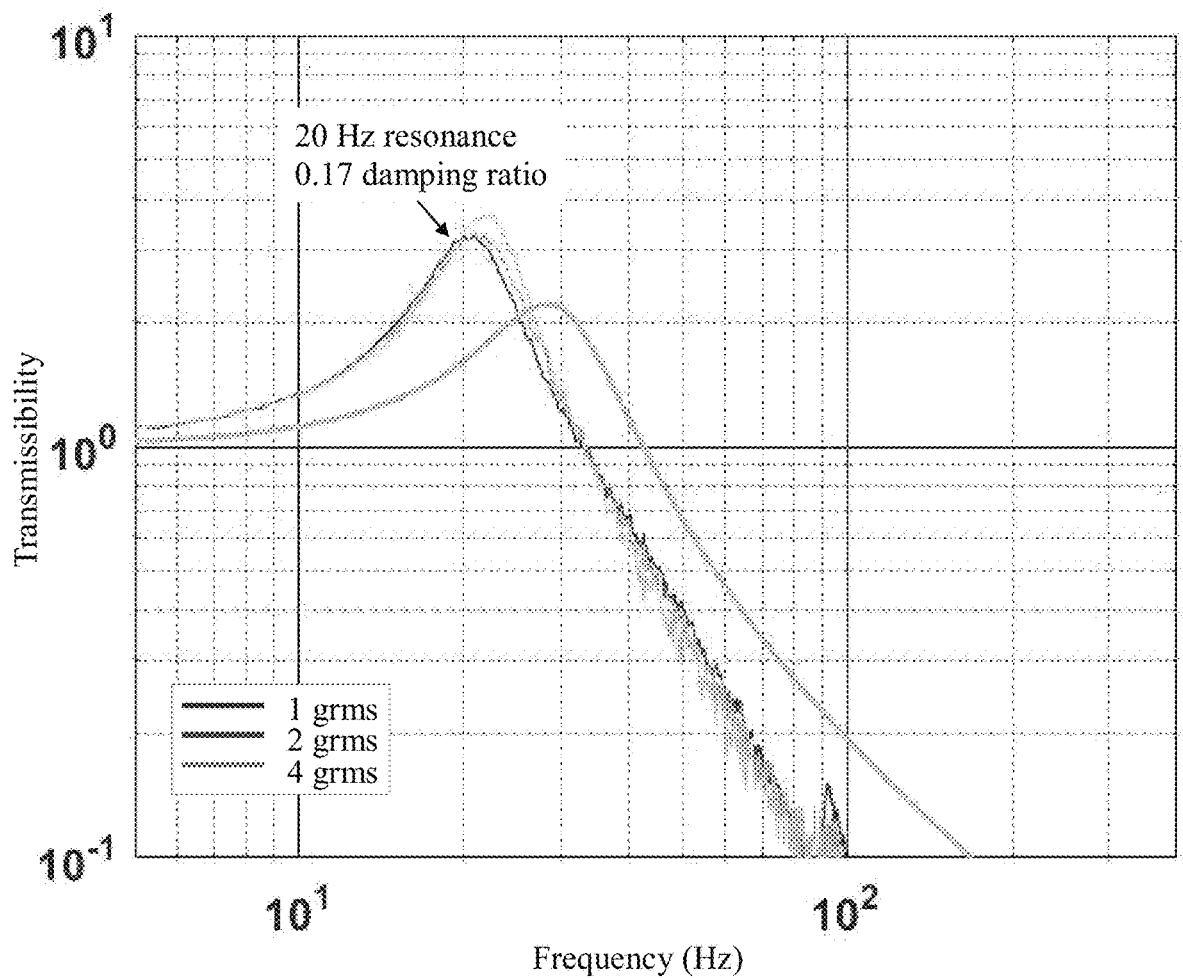

FIG. 5C depicts the transmissibility of vibrations through the embodiment of the four-chamber radial isolator 200 depicted in FIG. 1B as a function of the vibration frequency. In the illustrated embodiment, the four-chamber radial isolator 200 has a relatively low resonant frequency of approximately 20 Hz or less and a damping ratio of approximately 0.17. In one or more embodiments, the four-chamber radial isolator 200 may have any other damping ratio suitable for the environment in which the four-chamber radial isolator 200 is intended to be utilized and/or the nature of the isolated payload, such as, for instance, a damping ratio greater than approximately 0.17 or less than approximately 0.17.

FIG. 6 depicts two isolators (e.g., dual-chamber radial isolators 100, four chamber radial isolator 200, axial isolator 300, multi-axis isolator assembly 400, or multi-axis isolator 500) according to one or more embodiments of the present disclosure utilized in a petroleum drill well 601 to isolate a sensor chassis 602 containing one or more sensors from unwanted vibrations and/or shocks. In the illustrated embodiment, the isolators 100, 200, 300, 400, and/or 500 are connected to opposite ends of the sensor chassis 602. The isolators 100, 200, 300, 400, and/or 500 are configured to attenuate unwanted vibrations from a pressure casing 603 rigidly connected to a vibrating drill string 604 of the petroleum drill well 601. The isolators 100, 200, 300, 400, and/or 500 are configured to allow the sensor chassis 602 to translate and/or rotate with the pressure casing 603 with a prescribed amount of stiffness and damping such that desired degrees of freedom of motion of the sensor chassis 602 are isolated from the vibration of the drill string 604 and the pressure casing 603 rigidly connected thereto. In one or more embodiments, the isolators 100, 200, 300, 400, and/or 500 of the present disclosure may be utilized to isolate any other component or components from unwanted vibrations (e.g., the isolators 100, 200, 300, 400, and/or 500 may be utilized to isolate sensitive electronic payloads, such as sensor suites in missile bodies).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. A multi-axis isolator configured to isolate a payload from unwanted vibrations and shocks, the multi-axis isolator comprising:
a housing;
at least one pair of radial isolators in the housing;
an axial isolator in the housing; and
a shaft configured to be connected to the payload,
wherein a first radial isolator and a second radial isolator of the at least one pair of radial isolators each comprises an elastomer dome, a chamber at least partially defined by the elastomer dome, a fluid in the chamber, and a stem extending radially inward from the elastomer dome,
wherein the at least one pair of radial isolators comprises a fluid track placing the chamber of the first radial isolator in fluid communication with the chamber of the second radial isolator;
wherein the axial isolator comprises an elastomer dome, a backpressure membrane, a primary chamber at least partially defined by the elastomer dome, a backpressure chamber at least partially defined by the backpressure membrane, a fluid in the primary and backpressure chambers, and a conduit placing the primary chamber in fluid communication with the backpressure chamber,
wherein the backpressure membrane of the axial isolator is a resilient backpressure membrane,
wherein the at least one pair of radial isolators and the axial isolator are coupled to the shaft,
wherein, for each of the first radial isolator and the second radial isolator, the stem is narrower than the elastomer dome and separates the elastomer dome from the shaft,
wherein the at least one pair of radial isolators comprises a first pair of opposing radial isolators and a second pair of opposing radial isolators, and
wherein the first pair of opposing radial isolators is substantially orthogonal to the second pair of opposing radial isolators.

2. A multi-axis isolator configured to isolate a payload from unwanted vibrations and shocks, the multi-axis isolator comprising:
a housing;
at least one pair of radial isolators in the housing;
an axial isolator in the housing; and
a shaft configured to be connected to the payload,
wherein a first radial isolator and a second radial isolator of the at least one pair of radial isolators each comprises an elastomer dome tapering radially inward from a relatively wider rim to a relatively narrower trough, a chamber at least partially defined by the elastomer dome, a fluid in the chamber, and a stem extending radially inward from the trough of the elastomer dome toward a longitudinal axis of the shaft and connecting the elastomer dome to the shaft,
wherein the at least one pair of radial isolators comprises a fluid track placing the chamber of the first radial isolator in fluid communication with the chamber of the second radial isolator, the fluid track being separate from the stem of each of the first radial isolator and the second radial isolator;
wherein the axial isolator comprises an elastomer dome, a backpressure membrane, a primary chamber at least partially defined by the elastomer dome, a backpressure chamber at least partially defined by the backpressure membrane, a fluid in the primary and backpressure chambers, and a conduit placing the primary chamber in fluid communication with the backpressure chamber,
wherein the backpressure membrane of the axial isolator is a resilient backpressure membrane,
wherein the at least one pair of radial isolators and the axial isolator are coupled to the shaft, and
wherein, for each of the first radial isolator and the second radial isolator, the stem is narrower than the elastomer dome and separates the elastomer dome from the shaft.

3. The multi-axis isolator of claim 2, further comprising:
a stem extending axially from the elastomer dome of the axial isolator, wherein
the stem of the axial isolator is coupled to the shaft.

4. The multi-axis isolator of claim 2, wherein the first radial isolator of the at least one pair of radial isolators is oriented opposite to the second radial isolator of the at least one pair of radial isolators.

5. The multi-axis isolator of claim 2, wherein the at least one pair of radial isolators comprises a first pair of opposing radial isolators and a second pair of opposing radial isolators.

6. The multi-axis isolator of claim 2, wherein the fluid in the primary chamber and the backpressure chamber of the axial isolator comprises oil.

7. The multi-axis isolator of claim 2, wherein the elastomer domes of the first and second radial isolators and the axial isolator comprise silicone elastomer.

8. An isolator configured to isolate a payload from unwanted vibrations and shocks, the isolator comprising:

a first elastomer dome at least partially defining a first chamber, the first elastomer dome tapering radially inward from a relatively wider rim to a relatively narrower trough;

a first stem extending radially inward from the trough of the first elastomer dome;

a second elastomer dome at least partially defining a second chamber, the second elastomer dome tapering radially inward from a relatively wider rim to a relatively narrower trough;

a second stem extending radially inward from the trough of the second elastomer dome;

a fluid track extending from the first chamber to the second chamber, the fluid track placing the first chamber in fluid communication with the second chamber, the fluid track being separate from the first stem and the second stem;

a third elastomer dome at least partially defining a primary chamber;

a resilient backpressure membrane at least partially defining a backpressure chamber;

a conduit placing the primary chamber in fluid communication with the backpressure chamber;

a liquid in the first and second chambers, the primary chamber, and the backpressure chamber; and a shaft configured to be coupled to the payload, wherein the first, second, and third elastomer domes are coupled to the shaft, wherein the first stem is narrower than the first elastomer dome and separates the first elastomer dome from the shaft, wherein the second stem is narrower than the first elastomer dome and separates the second elastomer dome from the shaft, wherein the first stem connects the first elastomer dome to the shaft, and wherein the second stem connects the second elastomer dome to the shaft.

9. The isolator of claim 8, wherein the first elastomer dome is opposite the second elastomer dome.

10. The isolator of claim 8, wherein the first elastomer dome faces the second elastomer dome.

11. The isolator of claim 8, wherein each of the first and second elastomer domes comprises silicone elastomer.

12. The isolator of claim 8, wherein the liquid is oil.

13. The isolator of claim 12, wherein the oil is mineral oil.

14. An isolator assembly configured to isolate a payload from unwanted vibrations and shocks, the isolator assembly comprising:

at least three isolators each defining a longitudinal axis arranged together in a three-dimensional configuration in which the longitudinal axes are oriented in different directions, at least one isolator of the at least three isolators being the isolator of claim 8.

15. The isolator assembly of claim 14, wherein the three-dimensional configuration is selected from the group of shapes consisting of a cubic face-centered tetragonal, a square tetragonal, a triangular tetragonal, a sphere, and a hemisphere.

* * * * *